United States Patent [19]

Palmgren et al.

[11] Patent Number: 5,007,004

[45] Date of Patent: Apr. 9, 1991

[54] CONTROL CIRCUIT FOR POINT-GENERATING UNITS OF A WRITE HEAD

[75] Inventors: Sven Palmgren, Täby; Ove Tedenstig, Märsta, both of Sweden

[73] Assignee: Facit AB, Sundbyberg, Sweden

[21] Appl. No.: 468,878

[22] Filed: Jan. 23, 1990

[30] Foreign Application Priority Data

Apr. 6, 1989 [SE] Sweden ................................ 8901216

[51] Int. Cl.[5] ............................................ G06K 15/00

[52] U.S. Cl. .................................... 364/519; 364/200

[58] Field of Search ................................ 364/518-520, 364/235 MS File, 930 MS File, 239 MS File, 239.9 MS File, 240 MS File; 346/154; 358/296

[56] References Cited

U.S. PATENT DOCUMENTS

| | | | |
|---|---|---|---|
| 4,491,853 | 1/1985 | Hayashi et al. | 358/296 |
| 4,933,875 | 6/1990 | Kojima | 364/519 |

*Primary Examiner*—Arthur G. Evans

*Attorney, Agent, or Firm*—Burns, Doane, Swecker & Mathis

[57] ABSTRACT

A circuit (10) which is intended to control point-generating units (20) of the write head (18) in a printer. To this end, the print circuit (20) constitutes an interface between a central unit (12), an external direct access memory (RAM; 14) and a driver stage (16) which is intended to activate the write head (18). The circuit (10) also includes a control module (26), a pixel buffer module (28) and a rotation module (32) connected electrically to the direct access memory (14). The control module (26) enables address decoding, internal data buses, a command register and a test logic unit to be controlled. The pixel buffer module (28) holds a buffer memory filled with pixel data, when necessary. The control module (26) and the pixel buffer module (28) are connected to the central unit (12). The rotation module (32) is intended to determine the format of input pixel data for a data flow which is regulated to the point geometry of the write head (18).

8 Claims, 4 Drawing Sheets

CONTROL CIRCUIT FOR POINT-GENERATING UNITS OF A WRITE HEAD

BACKGROUND OF THE INVENTION

The present invention relates to a circuit for controlling point-generating units of the write-head of a printer, said circuit constituting an interface between a central unit, an external direct access memory and a driver which activates the write head. The novel circuit is configured to manage real-time tasks and tasks which would place an excessively high load on the central unit of a printer of this kind.

In order to obtain standardized software relating to the printer concerned, it is necessary to dispose the pixel data in vertical columns, irrespective of the physical dimensions of the write head. The conversion required herefor is thus handled by the control circuit, since a software converter would consume too much central-unit time. Synchronization of the print to a given position on the rows constitutes a real-time task. This is taken care of by the control circuit, which can use a clock signal from an external signal source or a linear position sensor having two or three phases for synchronizing print with the movement of the write head.

In the case of conventional printer write-heads, the point-generating units often comprise so-called write-head needles. These needles are normally arranged linearly in the write head and perpendicular to a row to be printed. In order to cover the maximum height of a print character, i.e. a full row division, the needles must, in this case, be placed very close together.

This places great demands on tolerances and material selection, which naturally leads to high manufacturerelated costs.

SUMMARY OF THE INVENTION

In order to eliminate these drawbacks, there has been proposed in recent years a new type of write head in which the needles are placed in a ramp-like configuration. In short, this means that in addition to covering a whole row division, the needles, which may be either 24 or 32 in number, will also extend along a given part of the length extension of respective rows. This enables the needles to be spaced more widely apart, such that the spacing between mutually adjacent needles will be much greater than the aforesaid needle arrangement in which the needles are disposed linearly and perpendicularly to the print row. The arrangement of the needles in a ramp-like configuration also enables manufacture of the write head to be greatly simplified in comparison with early methods of manufacture. The tolerance demands are no longer as strict as was previously the case, which greatly facilitates mechanical mounting of the head.

The primary object of the present invention is to provide a control circuit of the kind defined in the introduction, which is particularly suited for controlling the point-generating units of a write head, in which the units are disposed in a ramp-like configuration. The use of the novel control circuit, however, is not limited solely to the aforesaid new type of write head, but can also be used with write-heads whose point-generating units are disposed conventionally, at right angles to a print row, and also with write heads provided with point-generating units of other, modified configuration.

In accordance with the invention, a control circuit which fulfills the aforesaid requirements is characterized primarily in that the control circuit includes a control module with which address coding, internal data buses, a command register incorporated in the control module and a test logic unit incorporated in said control module, can be controlled, and further includes a pixel buffer module which, when necessary, will hold a buffer memory incorporated in said module filled with pixel data, wherein the control module and the pixel-buffer module are connected to the central unit, and said control circuit further comprising a rotation module which is connected electrically to the direct access memory and which is intended to determine the format of input pixel-data for adjustment of data flow to the point geometry of the write head. Particularly suitable embodiments of the novel circuit are set forth in the claims appendent to claim 1.

BRIEF DESCRIPTION OF THE DRAWINGS

The invention will now be described in more detail with reference to the accompanying drawings, in which.

DESCRIPTION OF PREFERRED EMBODIMENTS

Figure 1:
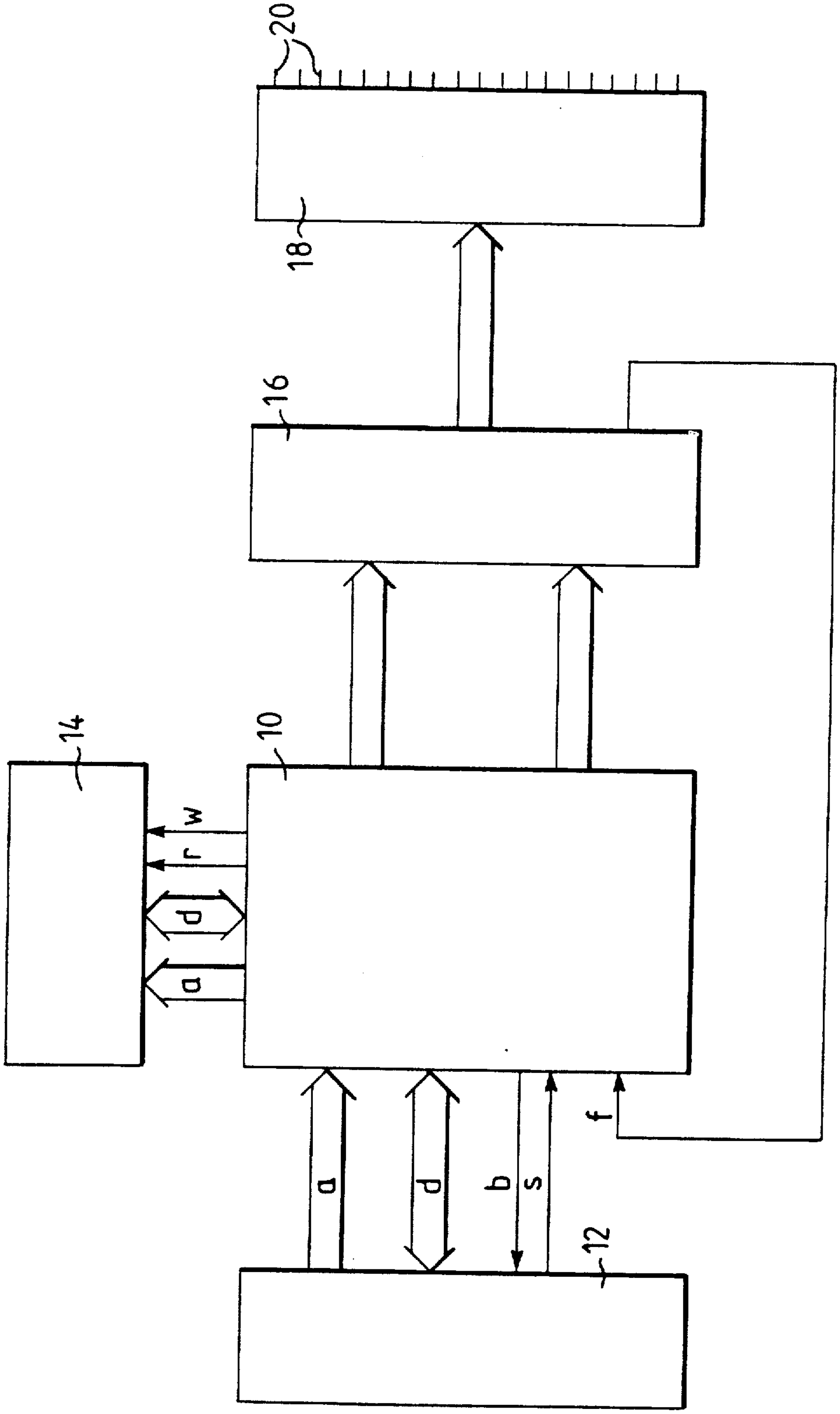
FIG. 1 is a block schematic illustrating a control circuit configured in accordance with the principles of the invention, and also illustrates the units of a printer co-acting with said circuit.
Figure 2:
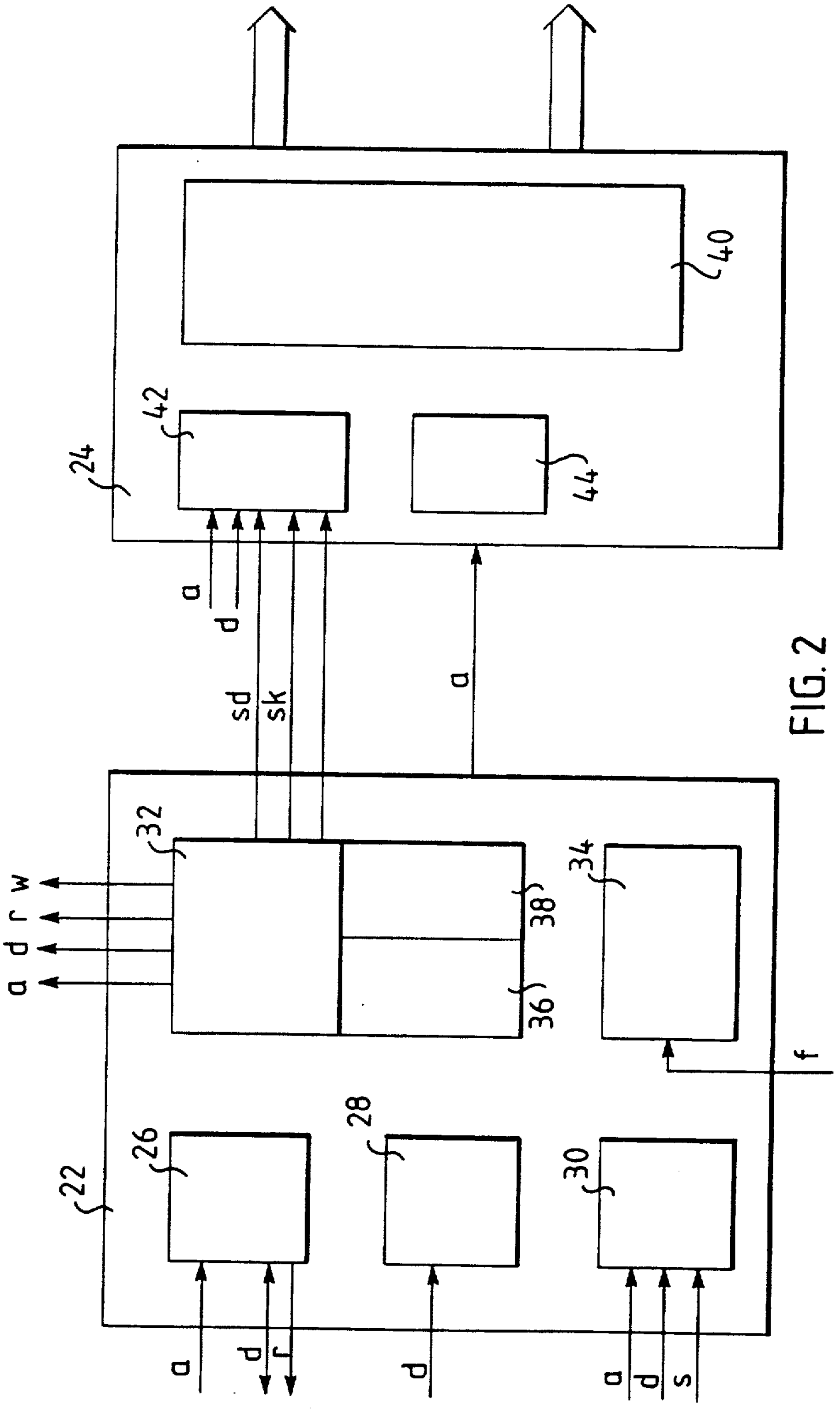
FIG. 2 illustrates in more detail a preferred embodiment of the control circuit of FIG. 1, together with the separate component units of the control circuit in the form of a block schematic.

With particular reference to FIGS. 1 and 2, the following reference signs are used to identify various signals occurring in the arrangement: a=address, b=interruption, d=data, f=flight time, r=reading, sd=series data, sk=series clock and w=writing.

The arrowed, two-directional lines represent bus conductors and signal directions, whereas the arrowed single conductors represent internal conductors and signal directions in the illustrated system.

As illustrated in FIG. 1, the control circuit 10 constitutes an interface between a central unit 12, an external direct access memory (RAM) 14, and a driver stage 16 which controls a write head 18 and associated needles 20, which are arranged to produce the print.

The control circuit (10) shown in FIG. 1 is illustrated in more detail in FIG. 2. In this latter figure, the various elements of the control circuit are divided-up on two separate chips 22, 24. The object of this is to enable the control circuit to be produced as cheaply as possible. As is well known, when all units are built-up on one and the same chip, the chip is much more expensive to produce. It is emphasized, however, that the embodiment of the control circuit illustrated in FIG. 1 is not intended in any way to limit the scope of the invention. The control circuit according to FIG. 2 should be considered as illustrative of a preferred embodiment. The chip 22 has a plurality of mutually different base elements or modules constructed thereon, namely a control module 26, a pixel buffer module 28, a position module 30, a rotation module 32 and a so-called flighttime measuring module 34. Each module may include a plurality of components and is capable of performing a plurality of functions. Belonging to the rotational module is also a print unit 36 and a direct access memory 38 through which needle spacing is controlled. Both of the units 36, 38 are shown to be connected directly to the rotation unit, although it will be understood that these units may be constructed individually on the chip 22.

It will also be seen from FIG. 2 that a pulse generating module 40 is built on the chip 24. The chip 24 also includes a separate control unit 42 and a time base unit 44.

Figure 3:
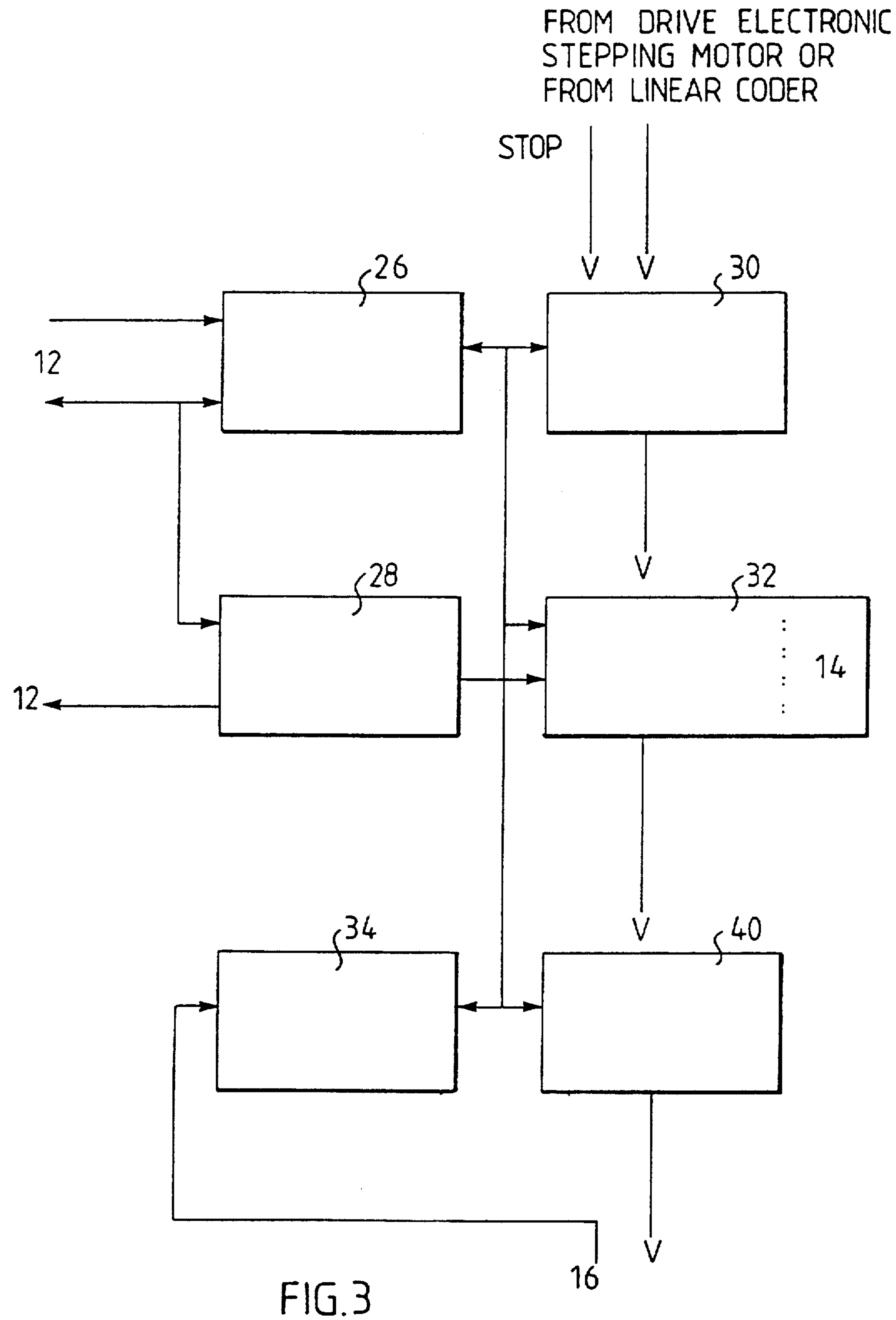
FIG. 3 illustrates the mutual connections between the modules incorporated in the control circuit of FIG. 2.

The mutual coupling arrangement with respect to the chip modules incorporated in the control circuit 10 is particularly evident from FIG. 3.

The actual control module 26 is responsible for address decoding and communicates with internal data buses, command register, status register and test logic. The position module 30 generates a signal which is synchronized to the position on the row. The signal commences when the command bit "print request" is inserted and at a given position and terminates when a command bit "print request" is eliminated. Position resolution is contingent on the signals from an external signal source. The stop function stops all needle activation immediately and saves the positions in a register incorporated in the position module 30. The status register includes three bits which are controlled by the control module 26. A "position warning" is instigated when the signal from the linear coder is corrected. A "position error" is instigated when the position module 30 is not able to correct the signal. A "stop" is instigated when the stop signal is activated.

When the command bit "print request" is inserted and space is available in the internal buffer of the pixel-data buffer module 28, the module transmits the pixel data request and awaits the receipt of a bit group or two columns, depending on the selected transmission mode. The pixel buffer module 28 endeavours to hold the buffer full for as long as the command bit "print request" is inserted.

Figure 4:
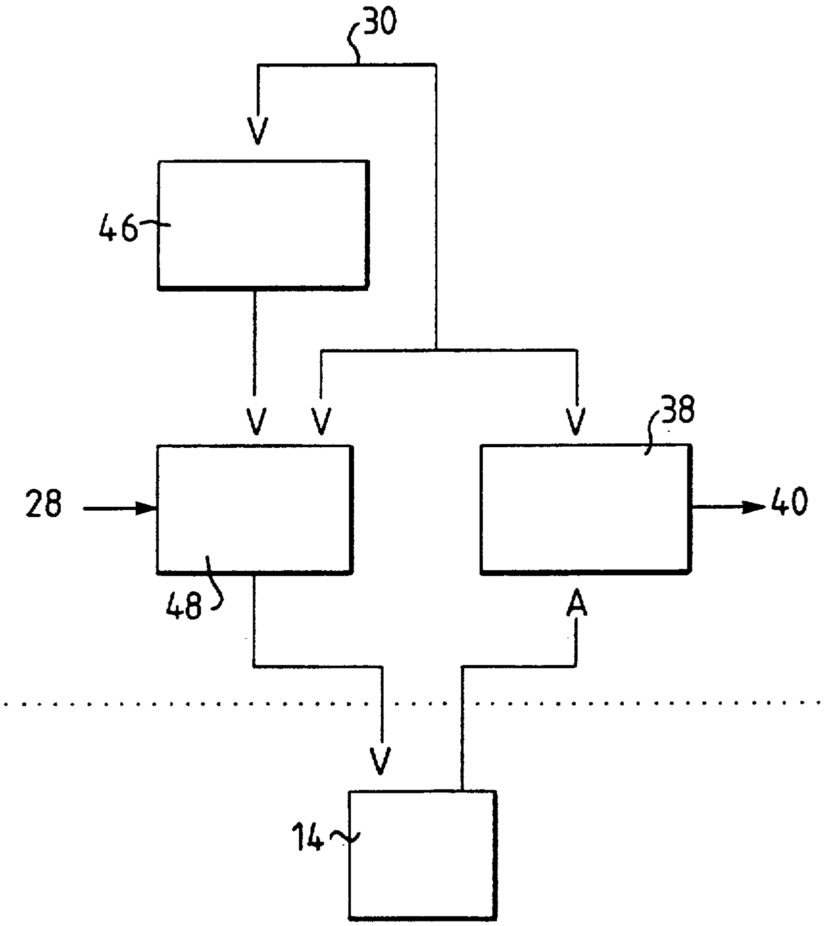
FIG. 4 illustrates the separate details with respect to the rotational module of the control circuit.

FIG. 4 illustrates in more detail the construction of the rotation module 32 and its connection to the external direct access memory 14. A print resolution unit 46 marks each position in the synchronous position signal corresponding to the stated print resolution. The output signal from the print resolution unit in FIG. 1 is a pixel-data synchronizing signal. A print activating circuit 48 is provided for writing a column in the external direction access memory 14 for each synchronous position signal. When the synchronous pixel data signal is active, the circuit 48 writes a pixel data column from the pixel buffer module 28. In other cases, the circuit 48 writes an empty column.

The direct access memory 38 intended for controlling needle spacing reads for each synchronous position signal information bit-wise for each needle which is indicated by individually given displacements from current columns in the direct access memory 14. The displacements are the physical distance from each needle 20 to a defined zero point in position resolution.

It should be noted that the direct access memory 14 is configured in a manner such as to contain all of the pixel columns covered physically by the write head 18.

The pulse generating module 40 supplies drive signals to all the needles 20 individually. The module comprises twenty-four 6-bit counters. The outgoing drive signals for each needle 20 consist of two signals.

The time values of the signals supplied by the pulse generating module 40 are stored in the time base unit 44. Each signal consists of two pulses, a write pulse and a damping pulse with a variable interspace. The control unit 42 of the chip 24 has the function of controlling the time base unit 44 and also the pulse generating module 40 on the chip 24.

The signal generated in the driver 16 by movement of the needles 20 can be used to measure the time taken for the needles 20 to move from the home position to the substrate and back again. This signal is connected to all drivers 16 and also to the flight time measuring module 34. The flight-time measuring module 34 measures the signal and calculates the time for movement of the needles 20. This can be read by the central unit 12. The time can be used to calculate the interspace between the write pulse and the damp pulse.

It will be understood that the afore-described control circuit 10 is not restricted to the embodiment specifically illustrated, and that modifications can be made within the scope of the following claims.

We claim:

1. A circuit for controlling point-generating units of the write head (18) of a printer, said circuit (10) forming an interface between a central unit (12), an external direct access memory (RAM; 14), and a driver stage (16) for activating the write head (18); characterized in that the circuit includes a control module (26) by means of which address coding, internal data buses, a command register incorporated in the control module and a test logic unit incorporated in said control module can be controlled, and further including a pixel buffer module (28) which, when required, maintains a buffer memory incorporated therein filled with pixel data, said control module (26) and pixel buffer module (28) being connected to the central unit (12), and further including a rotation module (32) which is connected electrically to the direct access memory (14) and which is intended to determine the format of input pixel data for a data flow regulated to the point geometry of the write head (18).

2. A circuit according to claim 1, characterized in that it includes a print resolving unit (36) connected to the rotation module (32).

3. A circuit according to claim 1, characterized in that it includes an internal needle-spacing-direct-access memory (RAM; 38) connected to the rotational module (32).

4. A circuit according to claim 1, characterized in that it includes a position module (30) operative to position points accurately on a substrate.

5. A circuit according to claim 1, characterized in that it includes a flight-time measuring module (34) which is connected to the driver stage (16) and which functions to determine various spacings between write head (18) and substrate and/or to determine the thickness of the substrate.

6. A circuit according to claim 1, characterized in that it includes a time base unit (44) for controlling current pulses transmitted to the write head (20).

7. A circuit according to claim 6, characterized in that it includes a pulse generating module (40) which is operative to distribute different times for pulses intended for activation of the pulse generating units (20).

8. A circuit according to claim 7, characterized in that it also includes a control unit (42) for controlling the time base unit (44) and the pulse generating module (40).

* * * * *